Jan. 31, 1967 V. GERBRACHT 3,301,515
SOAKER HOSE HOLDER
Filed May 3, 1965
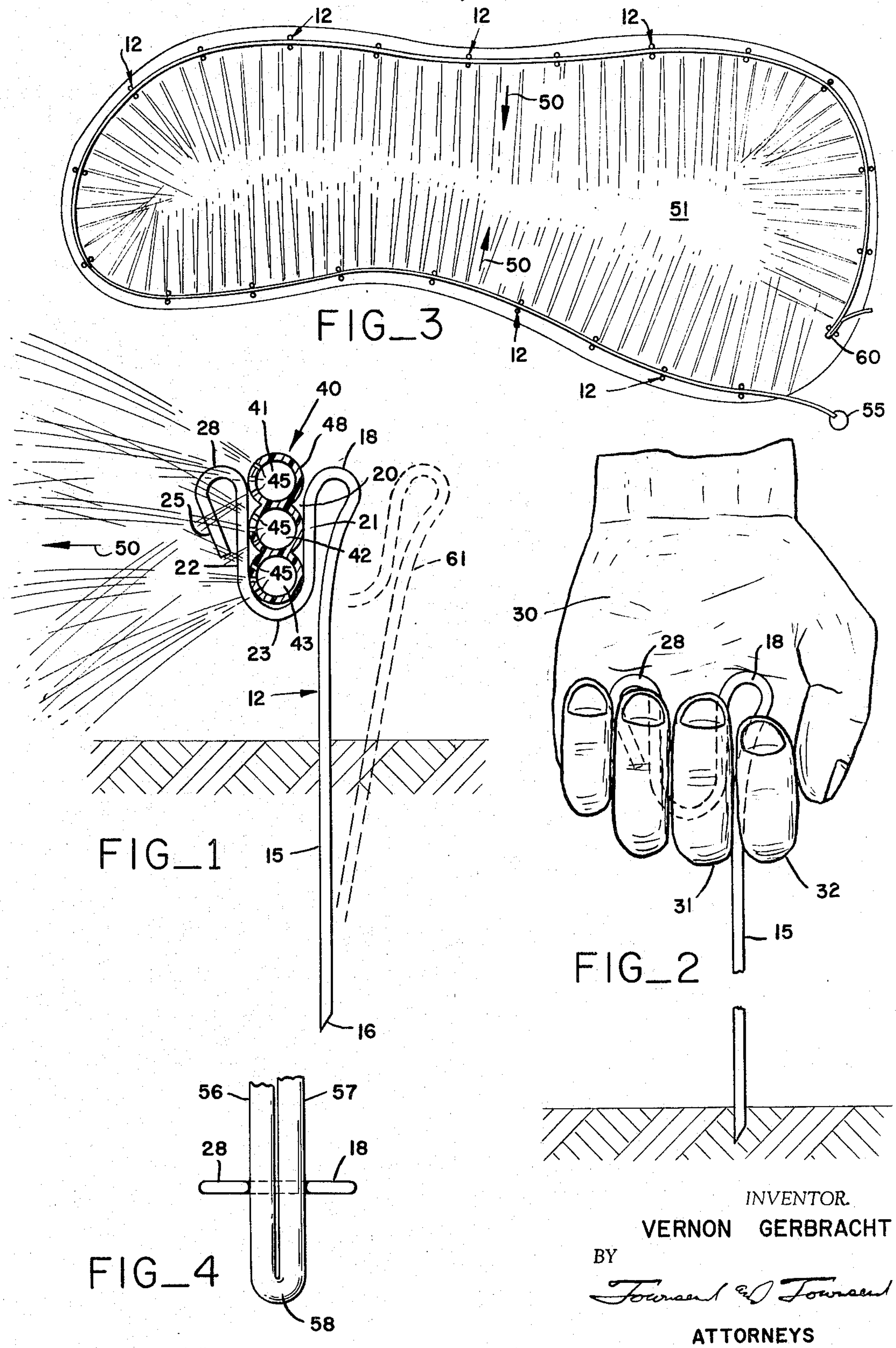
INVENTOR.
VERNON GERBRACHT
BY
Townsend and Townsend
ATTORNEYS United States Patent Office 3,301,515

Patented Jan. 31, 1967

3,301,515

SOAKER HOSE HOLDER

Vernon Gerbracht, 4 Descanso Way, San Rafael, Calif. 94903

Filed May 3, 1965, Ser. No. 452,819
1 Claim. (Cl. 248—87)

This invention relates to a bracket for supporting soaker type hoses of the type normally employed in home and industrial gardening applications.

The soaker hose which is a commonly available item in commerce generally comprises a water carrying hose which is formed with a plurality of apertures formed in the side walls of the hose throughout its length to provide a plurality of water jets functioning to spray water at various angles from the hose throughout its entire length. Such hoses are normally formed to provide an elongated cross section so that they can be rested on the ground with one face facing upwardly. The upwardly directed face conventionally carries the apertures for water distribution.

The object of the present invention is to provide a simple hook-like fitting which is adapted to be supported by the ground and which carries a clamp into which the soaker hose is nested in fixed cross-sectional vertical orientation in a position wherein the holes for water distribution are aligned in substantially vertical orientation.

One of the features and advantages of this invention lies in the fact that the hose is supported above the ground surface in a position to project water laterally towards one side only of the area to be watered. Such positioning allows the hose to be mounted immediately adjacent to the peripheral edge of the area to be watered. The position of the hose as held by the device of this invention thus directs water solely into the area to be watered and prevents the water distributing apertures of the hose from facing in a direction away from the periphery of the area to be watered.

A further object of this invention encompasses a flexibility in which the hose supporting device of this invention can be disposed at various angular relationships relative to the ground surface whereby full advantage of water flow control can be obtained with respect to hose configurations and areas to be watered.

Another feature and advantage of this invention lies in the fact that the device is adaptable to function well with hoses of various dimensions and shapes.

A still further object of the present invention is to provide a hose supporting device which can alternatively function to form a support and wedge functionally adapted to crimp a soaker hose to effectually terminate the water communication at the crimp maintained by the hose supporting device of this invention.

A still further object of the device of this invention is the provision of supporting surfaces on the top portion of the device which form broad faces by which the device can be conveniently hand inserted into the ground without the necessity of special tools.

Another feature and advantage of this invention lies in the simplicity of the device in that the entire structure can be formed of a single wire bent in a configuration to form the operative elements of the present invention.

Other objects, features and advantages of the present invention will be more apparent after referring to the following specification and attached drawings in which:

FIG. 1 is an elevational view showing the hose supporting device of this invention inserted into the ground with a soaker hose shown in cross section supported thereby, and in which an alternative position of the element with respect to the ground surface is indicated by broken lines.

FIG. 2 is an elevational view showing the position of a hand with respect to the hose support of this invention while the support is being inserted into the ground.

FIG. 3 is a schematic view showing an illustrative irregular lawn contour in which a soaker hose supported by the supporting device of the present invention is arranged to support the hose around the contour of the lawn area.

FIG. 4 is a top plan view showing a soaker hose bent over in crimped position and mounted within the hose support in order to form a termination for fluid communication through the hose at the crimp.

The hose support of the present invention, as seen in FIG. 1, is formed of a single piece of wire formed to provide a leg 15 of substantially straight configuration and terminating at the bottom in a sharpened end 16. The top portion of the device is arranged to fold over to form a first broad face 18 and thence depends downwardly and thereafter upwardly defining a hose supporting U-shaped nest 20 having two legs 21 and 22 joined by a bottom curved web 23. The end of leg 22 is thereafter similarly folded over and thence terminated in a downward position 25 to form at the top a second broad face 28.

In operation, the hose support is held in hand 30, as suggested in FIG. 2, in which the two top broad faces 18 and 28 are nested against the palm of the hand, and the bottom of the web is nested against the inside of the middle and index fingers 31 and 32. The straight member 15 is positioned between the index finger and finger 31 immediately adjacent the thumb. In this position the device can be firmly held and inserted into the ground with broad faces 18 and 28 forming broad bearing surfaces against the palm of the hand and with the remainder of the device forming leverage to control rotation of the device during ground insertion. It is important to note that the bent over section at 25 insures the elimination of sharp or dangerous ends or projections. After insertion into the ground a soaker hose, as seen in cross section in FIG. 1 at 40, is nested within nest 20. One familiar type of soaker hose commonly available and shown in FIG. 1 for purposes of illustration only comprises a plastic body containing three water channels 41, 42, and 43 integrally joined together in aligned relation. Water distributing apertures 45 are arranged to project from each of the conduits 41, 42, and 43 at a common side of the hose. Such hoses are commonly intended to be laid on the ground with the non-aperture-bearing side 48 resting on the ground in such a condition water from conduit 41 would flow to the right of the hose and water from conduit 43 would flow to the left with the water distribution from water conduit 42 being generally upwardly orientated. Thus, in the conventional pattern of the hose, water would flow generally to both sides of the hose configuration in equal distribution, thus requiring the hose to be placed in the center of the area to be watered. In positioning the hose as indicated in FIG. 1, all the apertures face in a common direction generally orientated towards the direction of arrow 50 so that no water is capable of flowing in the opposite direction. Because of the aforesaid placement a plurality of hose supports 12 can be placed around the peripheral edges of a lawn area, generally indicated at 51. In such a configuration, hose 40 is mounted with the apertures directed inwardly as indicated by the arrow 50 in FIG. 3. In this configuration all the water flow emanates from the peripheral edge of lawn 51 and is directed to cover the entire irregular area of the lawn without water flow being directed rearwardly from the peripheral edge of the lawn. The input to the hose, it is noted, occurs at a conventional faucet inlet schematically illustrated at 55. The termination of the hose can be effected as indicated in FIG. 4 in which the water pressure side of the hose 56 is arranged to fold over onto itself to form a returning leg 57. The two legs 56 and 57 are compressed together and nested within nest 20. This provides a crimp at web 58 of the hose blocking fluid communication, thus allowing the hose to be terminated at any desired length. It can be seen in FIG. 3 that the termination above suggested can occur as at 60. In such an arrangement it can be seen that the hose of any desired length can be arranged to cover the lawn contour and still be terminated at only the length necessary to complete area coverage.

As a further control afforded by the device of this invention, FIG. 1 shows in broken lines at 61 a suggested alternative placement of the device at an angular position off of straight vertical in order to position the axis of hose 40 to fulfill requirements of water distribution which occur by virtue of the orientation of water distributing apertures 45 of the hose structure.

It can be seen that the single and simple device of the present invention allows for the vertical support of soaker hoses at selected positions in which control of angular relationship of the hose is easily provided. At the same time the configuration affords a shape which is easily adapted to the human hand for physical insertion into ground positions and further provides a means for effective termination of fluid communication through the hose by affording a crimping hold for the hose end.

It is to be understood, while the soaker hose shown in the drawing is of a particular type, that the device is equally adapted for support of soaker hoses of other configurations in cross-sectional shape and in water distribution hose orientation.

It is noted that the hose support element 12 is formed of stiff wire folded over into the configuration described; however, it is believed obvious that the device could be formed of plastic or other materials preferably having some degree of flexibility and memory in order that the nested area 20 can maintain a spring urging against hose 40 to maintain the hose in frictional engagement within the nested area 20.

While several embodiments of the present invention have been shown and described it will be obvious that other adaptations and modifications may be made without departing from the true spirit and scope of the invention.

What is claimed is:

A soaker hose support comprising a single piece of wire-like material formed in a common plane to provide an elongated shaft section having one end adapted for insertion into a ground surface in substantially vertical orientation, the opposite end of said shaft section folded over to form a first curved upper end section and thence folded downwardly and thence upwardly to form a U-shaped nest section into which said soaker hose can be frictionally inserted for support above the ground surface.

References Cited by the Examiner

UNITED STATES PATENTS

| | | | |
|---|---|---|---|
| 854,178 | 5/1907 | Ruff | 248—87 |
| 1,144,495 | 6/1915 | Nelson | 248—87 |
| 1,537,237 | 5/1925 | Kaestner | 248—87 |
| 2,425,893 | 8/1947 | Molitor | 248—87 |
| 2,894,706 | 7/1959 | Cappio | 248—87 |
| 2,954,194 | 9/1960 | Alfano | 248—75 |

FOREIGN PATENTS

| | | |
|---|---|---|
| 106,092 | 12/1938 | Australia. |

CLAUDE A. LE ROY, *Primary Examiner.*